(12) United States Patent
Yuhas

(10) Patent No.: US 12,632,444 B2
(45) Date of Patent: May 19, 2026

(54) EXECUTION ENVIRONMENT AGNOSTIC FEDERATED QUERIES

(71) Applicant: Capital One Services, LLC, McLean, VA (US)

(72) Inventor: Brian Yuhas, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/820,991

(22) Filed: Aug. 30, 2024

(65) Prior Publication Data

US 2026/0064667 A1    Mar. 5, 2026

(51) Int. Cl.
G06F 16/242 (2019.01)
G06F 16/25 (2019.01)

(52) U.S. Cl.
CPC .......... G06F 16/242 (2019.01); G06F 16/256 (2019.01)

(58) Field of Classification Search
CPC ............................. G06F 16/242; G06F 16/256
USPC ......................................................... 707/765
See application file for complete search history.

(56) References Cited

U.S. PATENT DOCUMENTS

| | | | | |
|---|---|---|---|---|
| 2004/0111410 A1* | 6/2004 | Burgoon | ............. | G06F 16/2462 |
| 2023/0082563 A1* | 3/2023 | Chen | ..................... | G06F 16/242 |
| | | | | 707/607 |
| 2025/0086186 A1* | 3/2025 | Srinivasan | ............ | G06F 16/256 |

* cited by examiner

*Primary Examiner* — Cam Y T Truong

(74) *Attorney, Agent, or Firm* — Harrity & Harrity, LLP

(57) ABSTRACT

In some implementations, a device may obtain a federated query for a set of data associated with multiple data sources. The device may generate, based on the federated query, an abstract syntax tree indicating relationships between statements included in the federated query. The device may identify, based on the abstract syntax tree, one or more homogeneous statements in the federated query. The device may register, in a local database, one or more functions for respective homogeneous statements of the one or more homogeneous statements, wherein each function, of the one or more functions, includes execution code associated with multiple execution environments. The device may execute, via an execution environment based on the federated query, a local query for the local database using the one or more functions. The local query calls a subset of execution code, from the execution code, that is associated with an execution environment.

20 Claims, 7 Drawing Sheets

100

Local database

145
Register the function(s) to
a local database

150
Generate a local query
that use the function(s)

Query Management
Device

140
Generate functions for
each homogeneous
statement

400

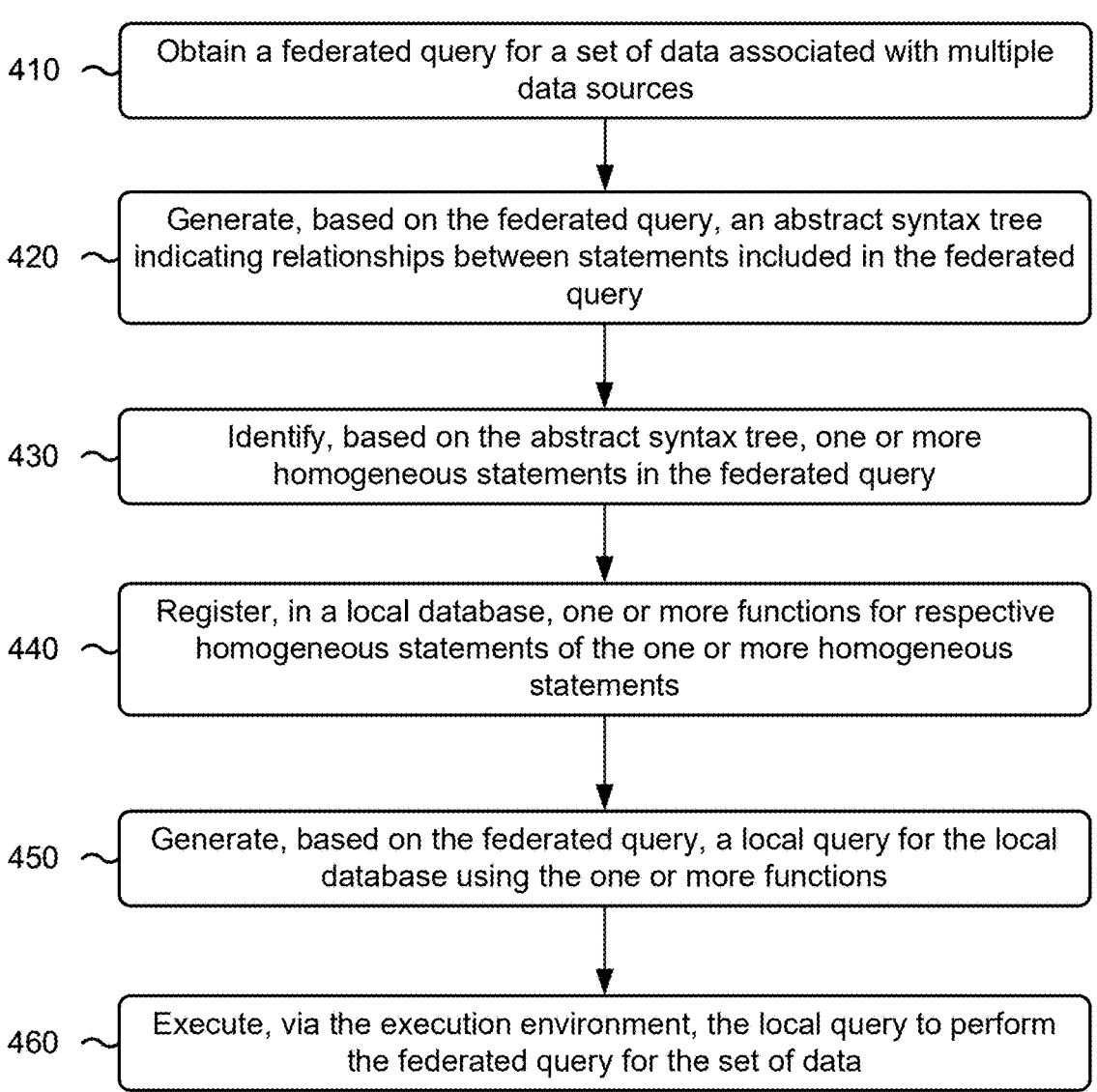

410 — Obtain a federated query for a set of data associated with multiple data sources 420 — Generate, based on the federated query, an abstract syntax tree indicating relationships between statements included in the federated query 430 — Identify, based on the abstract syntax tree, one or more homogeneous statements in the federated query 440 — Register, in a local database, one or more functions for respective homogeneous statements of the one or more homogeneous statements 450 — Generate, based on the federated query, a local query for the local database using the one or more functions 460 — Execute, via the execution environment, the local query to perform the federated query for the set of data

FIG. 4

EXECUTION ENVIRONMENT AGNOSTIC FEDERATED QUERIES

BACKGROUND

Structured query language (SQL) (sometimes referred to as "sequel") is a domain-specific language used in programming and designed for managing data held in relational databases and/or for stream processing in a relational data stream, among other examples. SQL may be useful in handling structured data, such as data incorporating relations among entities and variables. SQL may enable multiple records to be accessed via a single command without specifying how to reach a record (e.g., with or without an index).

SUMMARY

Some implementations described herein relate to a system for execution environment agnostic federated queries. The system may include one or more memories and one or more processors communicatively coupled to the one or more memories. The one or more processors may be configured to obtain a federated SQL query requesting a set of data from multiple data sources. The one or more processors may be configured to parse the federated SQL query to generate an abstract syntax tree indicating relationships between SQL statements included in the federated SQL query. The one or more processors may be configured to identify, based on the abstract syntax tree, one or more homogeneous SQL statements in the federated SQL query, wherein the one or more homogeneous SQL statements request one or more subsets of data, of the set of data, from respective data sources of the multiple data sources. The one or more processors may be configured to generate, based on executing the one or more homogeneous SQL statements, one or more functions for respective homogeneous SQL statements of the one or more homogeneous SQL statements, wherein each function, of the one or more functions, enables the one or more subsets of data to be accessible via a virtual table in a local database, and wherein each function includes execution code associated with multiple execution environments. The one or more processors may be configured to generate, based on the federated SQL query, a local query to the local database using the one or more functions, wherein the local query accesses a subset of execution code, from the execution code associated with multiple execution environments, that is associated with an execution environment. The one or more processors may be configured to execute, via the execution environment, the local query to obtain the set of data.

Some implementations described herein relate to a method for execution environment agnostic federated queries. The method may include obtaining, by a device, a federated query for a set of data associated with multiple data sources. The method may include generating, by the device and based on the federated query, an abstract syntax tree indicating relationships between statements included in the federated query. The method may include identifying, by the device and based on the abstract syntax tree, one or more homogeneous statements in the federated query, wherein the one or more homogeneous statements are associated with respective data sources of the multiple data sources. The method may include registering, by the device and in a local database, one or more functions for respective homogeneous statements of the one or more homogeneous statements, wherein each function, of the one or more functions, indicates information that enables one or more operations to be performed as indicated by a homogeneous statement associated with that function, and wherein each function includes execution code associated with multiple execution environments. The method may include generating, by the device and based on the federated query, a local query for the local database using the one or more functions, wherein the local query calls a subset of execution code, from the execution code associated with multiple execution environments, that is associated with an execution environment of the multiple execution environments. The method may include executing, by the device and via the execution environment, the local query to perform the federated query for the set of data.

Some implementations described herein relate to a non-transitory computer-readable medium that stores a set of instructions. The set of instructions, when executed by one or more processors of a device, may cause the device to obtain a federated SQL query requesting a set of data from multiple data sources. The set of instructions, when executed by one or more processors of the device, may cause the device to parse the federated SQL query to generate an abstract syntax tree indicating relationships between SQL statements included in the federated SQL query. The set of instructions, when executed by one or more processors of the device, may cause the device to identify, based on the abstract syntax tree, one or more homogeneous SQL statements in the federated SQL query, wherein the one or more homogeneous SQL statements request one or more subsets of data, of the set of data, from respective data sources of the multiple data sources. The set of instructions, when executed by one or more processors of the device, may cause the device to generate, based on executing the one or more homogeneous SQL statements, one or more functions for respective homogeneous SQL statements of the one or more homogeneous SQL statements, wherein each function, of the one or more functions, enables the one or more subsets of data to be accessible via a virtual table in a local database, and wherein each function includes execution code associated with multiple execution environments. The set of instructions, when executed by one or more processors of the device, may cause the device to generate, based on the federated SQL query, a local query to the local database using the one or more functions, wherein the local query accesses a subset of execution code, from the execution code associated with multiple execution environments, that is associated with an execution environment. The set of instructions, when executed by one or more processors of the device, may cause the device to execute, via the execution environment, the local query to obtain the set of data.

BRIEF DESCRIPTION OF THE DRAWINGS

FIG. 4 is a flowchart of an example process associated with execution environment agnostic federated queries, in accordance with some embodiments of the present disclosure.

DETAILED DESCRIPTION

Figure 1A:
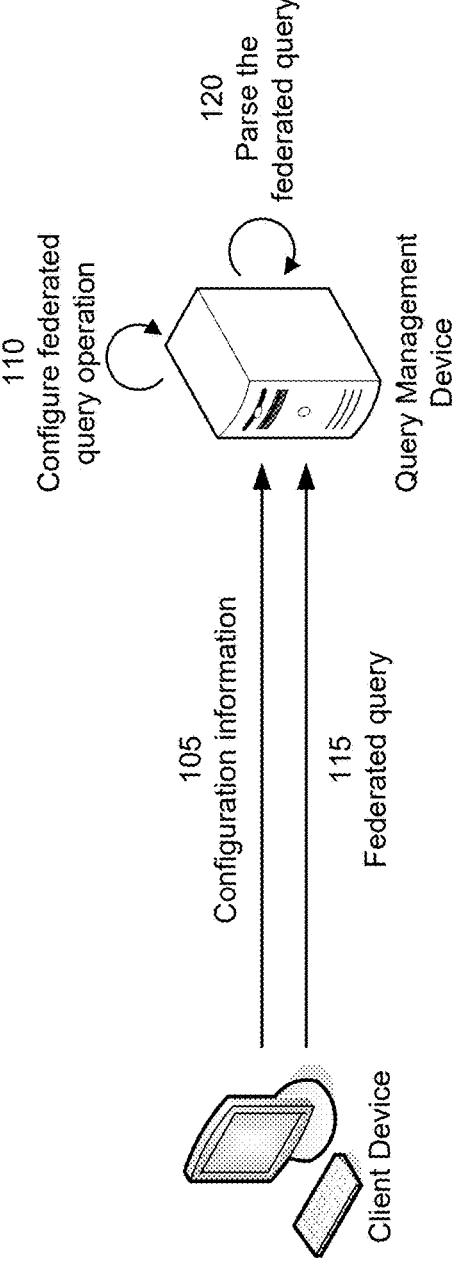
FIGS. 1A-1D are diagrams of an example associated with execution environment agnostic federated queries, in accordance with some embodiments of the present disclosure.

The following detailed description of example implementations refers to the accompanying drawings. The same reference numbers in different drawings may identify the same or similar elements.

In some examples, a query (e.g., an SQL query) may retrieve or manipulate data from multiple (e.g., often heterogeneous) data sources. A query that is configured to retrieve or manipulate data from multiple data sources is referred to herein as a "federated" query (e.g., a federated SQL query). When an SQL query is executed across multiple databases, challenges may arise due to differences in database schema, query syntax, and/or transaction management protocols, among other examples. For example, ensuring compatibility and consistency across databases with varying SQL dialects and versions requires complex handling of data types, functions, and/or potential differences in indexing strategies. Additionally, maintaining transactional integrity and performance optimization across disparate database connections adds complexity, often necessitating advanced querying techniques and thorough testing to ensure reliable and efficient data retrieval or modification operations.

Each access of a data source may involve computing and/or power resources associated with accessing the data source to enable a device executing the SQL query to retrieve data from the data source. Thus, different (e.g., repeated) accesses of the same database can, at scale, use an inordinate amount of computing and/or power resources. Furthermore, because each access involves a time window associated with accessing the data source, repeatedly accessing the data source can introduce delay to the data retrieval from the data source.

In some examples, a federated query engine may enable querying across different databases, file systems, and/or other data repositories as if they were part of a single database.

For example, a federated query engine may translate and distribute the query execution across the relevant data sources, aggregate results, and present the results to a user or application. This approach enables efficient data integration and access across distributed and diverse data environments without the need for physical data movement or replication.

A federated query engine may be isolated or restricted to executing in a given execution environment. However, federated query engines often use complex and large scale execution environments. This may result in complicated deployments because of execution environment dependencies on specific infrastructure and configurations, potentially requiring specialized knowledge for setup and maintenance. Further, this results in higher costs (e.g., computing or processing resource costs and/or monetary costs) because of the use of infrastructure resources that are tailored to the requirements of the execution environment of the federated query engine, limiting affordability for smaller or personal projects. In some examples, the use of a given execution environment may result in access control challenges associated with managing complex permissions and security configurations specific to the execution environment, potentially discouraging adoption in niche projects or environments with limited administrative resources. As a result, the restriction of the federated query engine to a given execution environment may limit accessibility and scalability of the federated query engine across diverse use cases.

Some implementations described herein enable execution environment agnostic federated queries. In some implementations, a query management device may obtain a query (e.g., an SQL query). The query may be a federated query (e.g., a federated SQL query). The query management device may parse the query to obtain or generate a syntax tree (e.g., an abstract syntax tree). The abstract syntax tree may represent or indicate the hierarchical structure of the query in a standardized and/or abstract form. The query management device may identify, based on the abstract syntax tree, components or portions of the query that are homogeneous (e.g., that are associated with accessing data from a single data source). The query management device may register the identified components or portions as a function in a local database (e.g., as a virtual table or a view in the local database). The functions may include execution code associated with multiple execution environments.

The query management device may generate, based on the federated query, a local query to the local database using the one or more functions. The local query may access or indicate a subset of execution code, from the execution code associated with multiple execution environments, that is associated with an execution environment. The execution environment may be indicated by the federated query and/or may be configured for the query management device. The query management device may execute, via the execution environment, the local query to obtain, write, manipulate, and/or otherwise process a set of data indicated by the federated query.

As a result, the query management device may efficiently process, translate, and/or distribute a federated query in an execution environment agnostic manner. For example, after generating and/or storing the functions in the local database (e.g., registering one or more views or virtual tables for the federated query in the local database), the query management device may execute the federated query in any one of multiple execution environments. For example, by the query management device including execution code associated with multiple execution environments in each function (e.g., in each view or virtual table registered via the local database), the query management device may execute the federated query in any one of multiple execution environments (e.g., by calling or indicating a particular subset of the execution code when executing the federated query). This reduces the complexity of processing the federated query because the processing, translating, and/or optimization of the federated query is decoupled from any particular execution environment or backend processing environment. Additionally, this reduces the complexity of and/or conserves processing resources, computing resources, and/or memory resources that would have otherwise been associated with processing, translating, and/or optimization of the federated query separately for each execution environment of the multiple execution environment. Further, by decoupling the processing, translating, and/or optimization of the federated query from a particular execution environment, the query management device may be used to execute federated queries for different infrastructures, configurations, and/or use cases, among other examples, thereby improving accessibility and scalability of executing federated queries across diverse use cases.

FIGS. 1A-1D are diagrams of an example 100 associated with execution environment agnostic federated queries. As shown in FIGS. 1A-1D, example 100 includes a query management device, a client device, a local database, and one or more data sources. These devices are described in more detail in connection with FIGS. 2 and 3.

As shown in FIG. 1A, and by reference number 105, the client device may provide, and the query management device may obtain, configuration information. The configuration information may be associated with configuring a federated query operation described herein. The configuration information may be included in a configuration file, and/or configuration code, among other examples. The configuration information may include instructions for performing one or more (or all) operations performed by the query management device, as described in more detail elsewhere herein.

The configuration information may include configurations for respective execution environments of multiple execution environments. As used herein, "execution environment" refers to an environment, infrastructure, and/or framework via which a query (e.g., an SQL query) is executed. An execution environment may be a backend framework or infrastructure used to execute a query. In some examples, an execution environment may include a software library, a dataframe library (e.g., a data analysis library), an application programming interface (API), a data processing engine, a processing system, a parallel computing engine, and/or a cloud-based execution environment, among other examples.

For example, the configuration information may indicate sets of execution code for respective execution environments. The execution code may include code or instructions configured to enable a device (e.g., the query management device) to communicate with, interact with, and/or otherwise execute queries via a given execution environment.

The configuration information may include an indication that a given execution environment is to be used to execute federated queries (e.g., federated SQL queries). For example, the configuration information may configure multiple execution environments. The configuration information may indicate that an execution environment, from the multiple execution environments, is enabled or activated for use by the query management device. The execution environment that is enabled or activated for use (e.g., that is selected to execute federated queries as described herein) may be modified or changed over time. For example, the client device (or another client device) may provide, and the query management device may obtain, updated configuration information indicating that the query management device is to use a different execution environment, from the multiple execution environments, for executing federated queries as described herein.

In some implementations, the configuration information may include an indication of identifiers for respective data sources. An identifier may be included in an SQL statement to indicate that an operation is associated with a data source that is associated with the identifier. The configuration information may include the indication of identifiers to enable the query management device to quickly identify which data source is associated with an SQL statement included in a federated query. For example, the configuration information may include a syntax configuration for the federated query operation described herein. The syntax configuration may indicate a prefix (e.g., the identifier) to be used when an SQL statement or command is associated with a given data source.

As shown by reference number 110, the query management device may configure a federated query operation. For example, the query management device may configure the federated query operation based on, or otherwise associated with, the configuration information. For example, the query management device may configure itself to perform one or more operations described herein based on the configuration information. The query management device may store the configuration information for use during federated query operations.

As shown by reference number 115, the client device (or another client device) may provide, and the query management device may obtain, a federated query. The federated query may be an SQL query. The federated query may indicate data from multiple data sources. For example, the federated query may indicate that a set of data may be accessed, retrieved, written, manipulated, and/or otherwise processed. The set of data may be associated with multiple data sources. The multiple data sources may be associated with different data formats, different access procedures, and/or different storage locations, among other examples.

As shown by reference number 120, the query management device may parse the federated query. For example, the query management device may parse the federated query to generate an abstract syntax tree indicating relationships between statements (e.g., SQL statements) included in the federated query, as described in more detail elsewhere herein. A statement (e.g., an SQL statement) may include a command used to interact with a data source. For example, a statement may be configured to enable a device (e.g., the query management device) to retrieve, manipulate, and manage data stored in a database. A statement may be used to perform data processing tasks, such as querying data, inserting new records, joining multiple records, updating existing records, and/or deleting records, among other examples.

For example, the query management device may parse the federated query into tokens representing keywords (e.g., SELECT, FROM, or other keywords), identifiers (e.g., table names, column names, or other identifiers), literals (e.g., string values, numbers), and/or operators (e.g., =, +), among other examples. The query management device may use lexical tokenization or lexical analysis to recognize and categorize each token based on one or more rules for SQL syntax. The query management device may construct a parse tree by applying syntax parsing techniques that are based on SQL grammar rules, ensuring the hierarchical structure of the federated query is accurately represented. For example, the query management device may perform recursive descent parsing to validate the sequence and arrangement of tokens. The query management device may perform semantic analysis to validate and annotate the tree with contextual information such as resolving references to database objects and checking for semantic correctness.

Figure 1B:
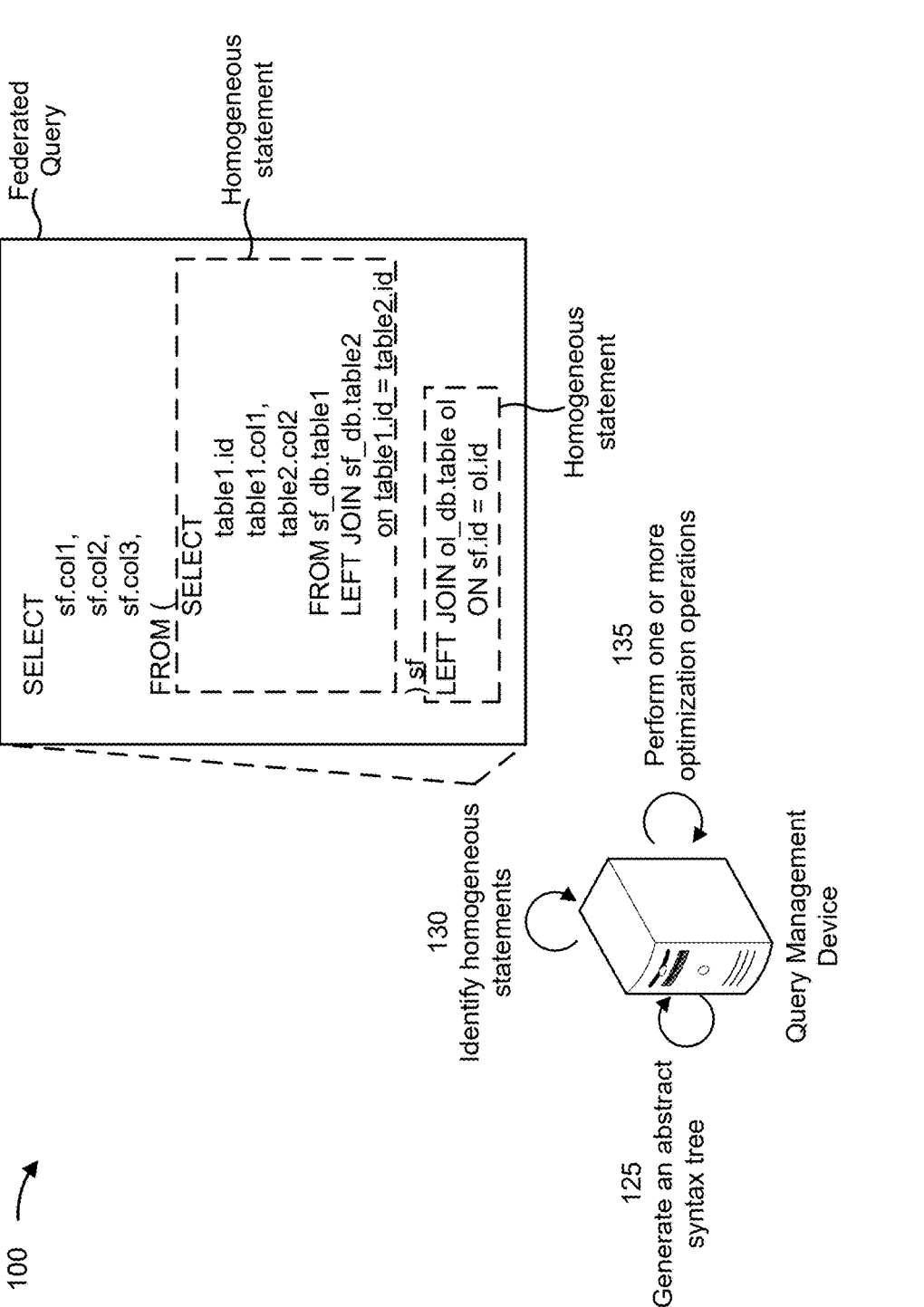

As shown in FIG. 1B, and by reference number 125, the query management device may generate an abstract syntax tree based on parsing the federated query. The abstract syntax tree may indicate relationships between statements included in the federated query. For example, the abstract syntax tree may be a structured representation of the federated query, organizing the federated query into nodes corresponding to different components, such as SELECT statements, JOIN clauses, and/or WHERE conditions, among other examples. The abstract syntax tree may enable the query management device to programmatically inspect and/or modify the abstract syntax tree. This enables the query management device to perform tasks for the federated query, such as query analysis, optimization, and/or generation of SQL code compatible with various SQL dialects and database systems (e.g., various execution environments), among other examples.

For example, parsing the federated query into an abstract syntax tree may enable the query management device to traverse the abstract syntax tree, extract specific elements, apply transformations, and/or generate SQL code that adheres to the syntax rules of various target databases and/or execution environments. This enables the query management device to interact with, analyze, and/or modify the federated query programmatically, ensuring flexibility and reliability in the federated query operation.

As shown by reference number 130, the query management device may identify one or more homogeneous statements included in the federated query. As used herein, "homogeneous" statement refers to a statement included in the federated query that is associated with a single data source. A "heterogeneous" statement is a statement that involves accessing or using data from multiple environments or multiple data sources. The query management device may identify, based on the abstract syntax tree, one or more homogeneous SQL statements in the federated query. For example, the one or more homogeneous SQL statements may request one or more subsets of data, of the set of data, from respective data sources of the multiple data sources.

For example, each segment of the federated query related to different data sources may be represented as nodes within the abstract syntax tree, encompassing SELECT statements, JOIN conditions, and/or other SQL operations. To identify homogeneous statements, the query management device may inspect or analyze nodes for similarities in syntactic structure and operation types across the distributed parts of the federated query. For example, the query management device may compare SELECT statements within different database segments to check whether they retrieve similar columns or apply analogous WHERE clauses. The query management device may perform semantic analysis to ensure that identified segments are not only syntactically similar but also semantically compatible, accounting for differences in data types, schema definitions, and/or SQL dialect nuances, among other examples.

For example, as shown in FIG. 1B, the federated query may include one or more homogeneous statements. As an example, a first homogeneous statement may be associated with a SELECT operation and a LEFT JOIN operation from a given data source (e.g., identified using the prefix "sf" as shown in FIG. 1B). A second homogeneous statement may be associated with a LEFT JOIN operation from another data source (e.g., identified using the prefix "ol" as shown in FIG. 1B).

As shown by reference number 135, the query management device may perform one or more optimization operations for the federated query. For example, the query management device may perform, based on the abstract syntax tree, a common subexpression elimination operation to generate one or more common expressions. The common subexpression elimination operation may enable the query management device to reduce redundant computations and improve execution efficiency of the federated query. The query management device may generate identifiers for each unique expression encountered during traversal of the abstract syntax tree. The identifiers can be created using hashing techniques, where the subtree of an expression is hashed to produce a unique hash identifier. For example, a hash function (e.g., secure hash algorithm (SHA)-256 or another hash function) can be applied to the subtree to generate a hash identifier that uniquely represents the structure and operands of the subtree. Alternatively, the query management device may generate identifiers based on the textual representation of the expression, ensuring uniqueness by comparing the entire expression string.

The query management device may maintain a mapping between the hash identifiers and the corresponding expressions or subtrees in the abstract syntax tree. When the query management device encounters a new expression, the query management device may compute an identifier and check whether the identifier already exists in the mapping. If a match is found, the query management device may determine that the expression has been encountered before, and the query management device may replace subsequent occurrences of the expression with a reference to the identifier. This replacement eliminates redundant statements or commands by reusing references or data obtained via another statement, thereby optimizing the overall execution of the federated query.

As another example, one or more optimization operations may include one or more filtering operations. For example, the query management device may perform one or more filtering operations for one or more SQL statements included in the federated SQL query. The one or more filtering statements may include a projection pushdown operation, and/or a predicate pushdown operation, among other examples. For example, the query management device may generate, based on performing the one or more filtering operations, an updated version of the federated SQL query.

For example, for a projection pushdown operation, the query management device may identify, based on the abstract syntax tree, a list of columns (e.g., attributes) specified in a statement that are needed for the query result. For each remote data source involved in the federated query, the query management device may generate an optimized SQL query or statement that includes only the required columns specified in the statement. By pushing down the projection, the query management device may reduce the amount of data transferred over a network, as only the necessary columns are retrieved from each data source. This optimization reduces latency and improves overall query performance.

For a predicate pushdown operation, the query management device may filter conditions (e.g., predicates) of WHERE clauses down to the data sources. This allows the filtering to be performed closer to the data, reducing the amount of data transferred over a network and improving query performance. For example, the query management device may identify, using the abstract syntax tree, predicates within the WHERE clauses of the federated query. Predicates may be associated with conditions, such as equality checks, range queries, and/or logical operations, among other examples. The query management device may rewrite the federated SQL query to include the predicates in the statements to be sent to each data source. This ensures that filtering is applied at the source, reducing the volume of data transmitted over the network. By pushing predicates down to the data sources, the query management device may leverage the computational resources and indexing capabilities of the data sources hosting the data, leading to faster query processing and reduced computational load on the query management device.

Figure 1C:
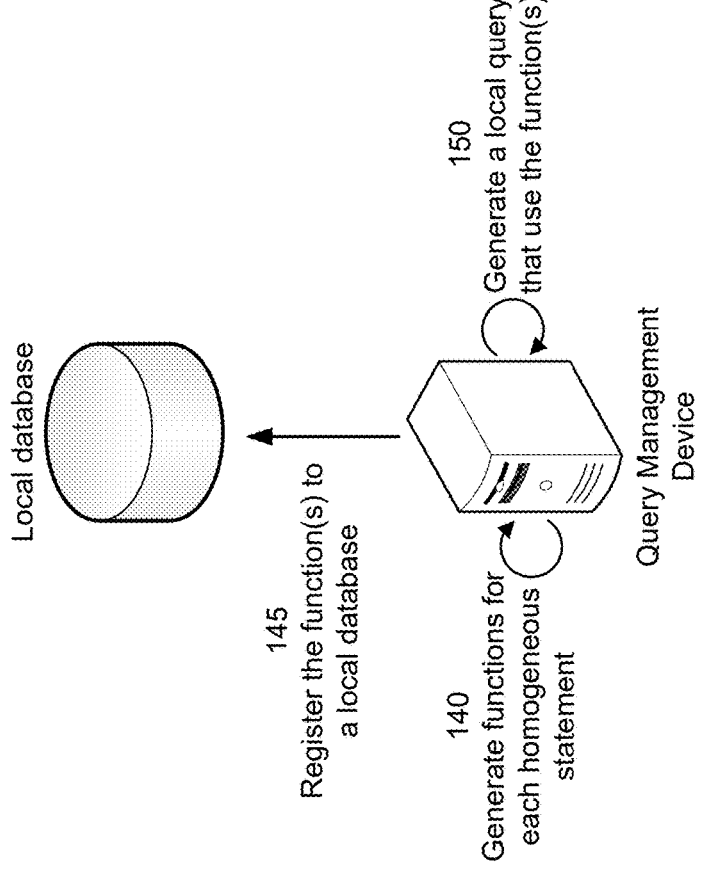

As shown in FIG. 1C, and by reference number 140, the query management device may generate a function for each homogeneous statement identified in the federated query. For example, the query management device may generate, based on executing the one or more homogeneous SQL statements, one or more functions for respective homogeneous SQL statements of the one or more homogeneous SQL statements. Each function, of the one or more functions, may enable one or more subsets of data to be accessible via a virtual table in a local database. The function may be a view in the local database. A view may be a virtual table that represents the result set of a stored query. Unlike physical tables, which store data persistently, a view may not store data itself, but instead may derive data from one or more underlying tables or other views in the database. A view may be defined by an SQL query that specifies the columns and rows to include based on certain criteria or conditions. For example, a generated function may be a view that includes an SQL query that is based on a given homogeneous SQL query identified by the query management device.

For example, the query management device may determine, for a data source of the multiple data sources and based on a homogeneous SQL statement of the one or more homogeneous SQL statements, one or more data access operations to access data, from the set of data, associated with the data source. The query management device may generate a function, of the one or more functions, to indicate the one or more data access operations. For example, a given function or view may indicate information that enables one or more operations (e.g., one or more data processing operations) to be performed as indicated by a homogeneous statement associated with that function or view.

The function may also include or reference execution code associated with the multiple execution environments. For example, each function may include or reference the execution code associated with the multiple execution environments. For example, a function or view may be configured to execute the execution code associated with the multiple execution environments.

In some implementations, one or more functions of the one or more functions indicates a common expression of the one or more common expressions identified as part of the optimization operation(s) (e.g., as described in connection with reference number 135). For example, a function may indicate an identifier (e.g., a hash identifier) associated with the common expression. Additionally, or alternatively, the query management device may generate the one or more functions based on the updated version of the federated SQL query generated as part of the optimization operation(s) (e.g., described in connection with reference number 135).

As shown by reference number 145, the query management device may register the function(s) to the local database. For example, the query management device may register, in the local database, one or more functions for respective homogeneous statements of the one or more homogeneous statements identified in the federated query. For example, the query management device may store views for respective functions of the one or more functions in the local database. In some examples, registering the function (or view) may include querying, loading, and/or executing SQL statements of the one or more homogeneous statements identified in the federated query. For example, the function or view may reference or derive data from a given underlying data source based on the identified homogeneous SQL statement associated with that given underlying data source. In some implementations, a registered function or view may reference an identifier (e.g., a hash identifier) of another expression, function, or view.

As shown by reference number 150, the query management device may generate a local query that uses the function(s) or view(s). For example, the query management device may generate, based on the federated SQL query, a local query to the local database using the one or more functions. For example, the local query may reference the registered views or functions (e.g., rather than the external or remote data sources). The local query may be based on the abstract syntax tree and/or the federated query. For example, the local query may follow the hierarchical structure of the federated query, but referencing or calling the view(s) in the local database (e.g., rather than the external or remote data sources). The local query may include similar commands or SQL statements as the federated query, but referencing or calling the view(s) in the local database (e.g., rather than the external or remote data sources).

The local query may be configured to access a subset of execution code, from the execution code associated with multiple execution environments, that is associated with an execution environment. For example, the local query may call a subset of execution code, from the execution code associated with multiple execution environments, that is associated with an execution environment of the multiple execution environments. This enables the local query to be executed via the execution environment while the registered functions or views are capable of being executed via the multiple execution environments, thereby providing increased flexibility for the execution of the local query.

Figure 1D:
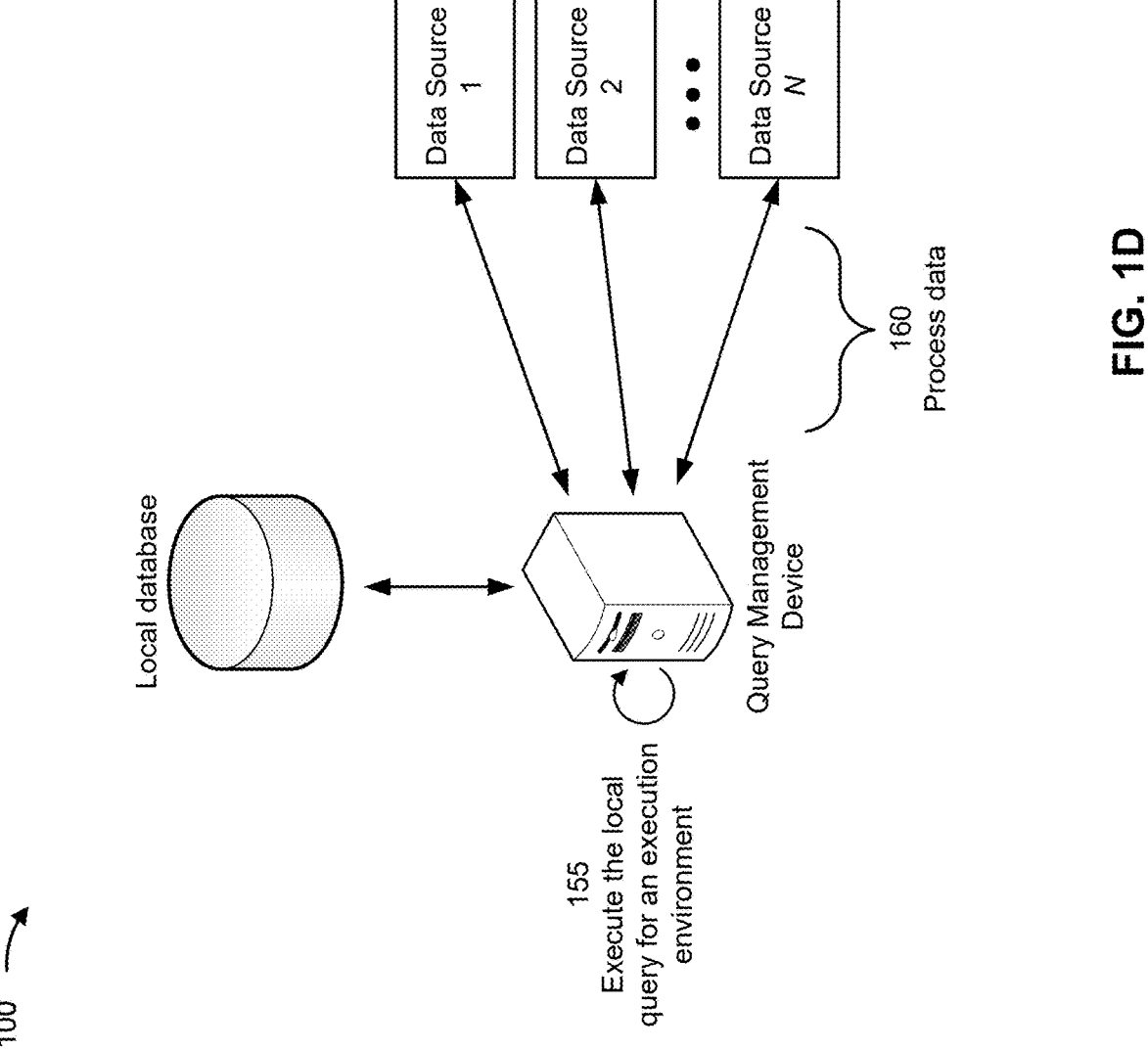

As shown in FIG. 1D, and by reference number 155, the query management device may execute the local query via the execution environment. For example, the query management device may execute, via the execution environment, the local query to obtain, write, modify, manipulate, and/or otherwise process the set of data indicated by the federated query.

For example, as shown by reference number 160, the query management device may process data, via the execution environment, in association with multiple data sources. The query management device may perform one or more data processing operations via the multiple data sources based on executing the local query via the execution environment. For example, the query management device may obtain at least a portion of the set of data from the multiple data sources. Additionally, or alternatively, the query management device may join at least a portion of the set of data from the multiple sources. Additionally, or alternatively, the query management device may write at least a portion of the set of data to the multiple data sources.

In some implementations, the query management device may provide, and the client device may obtain, an indication that the federated query has been executed or completed. In some implementations, if the federated query indicates that data is to be retrieved, then the query management device may provide the data to the client device (or store the data in a storage location indicated by the federated query).

As indicated above, FIGS. 1A-1D are provided as an example. Other examples may differ from what is described with regard to FIGS. 1A-1D.

Figure 2:
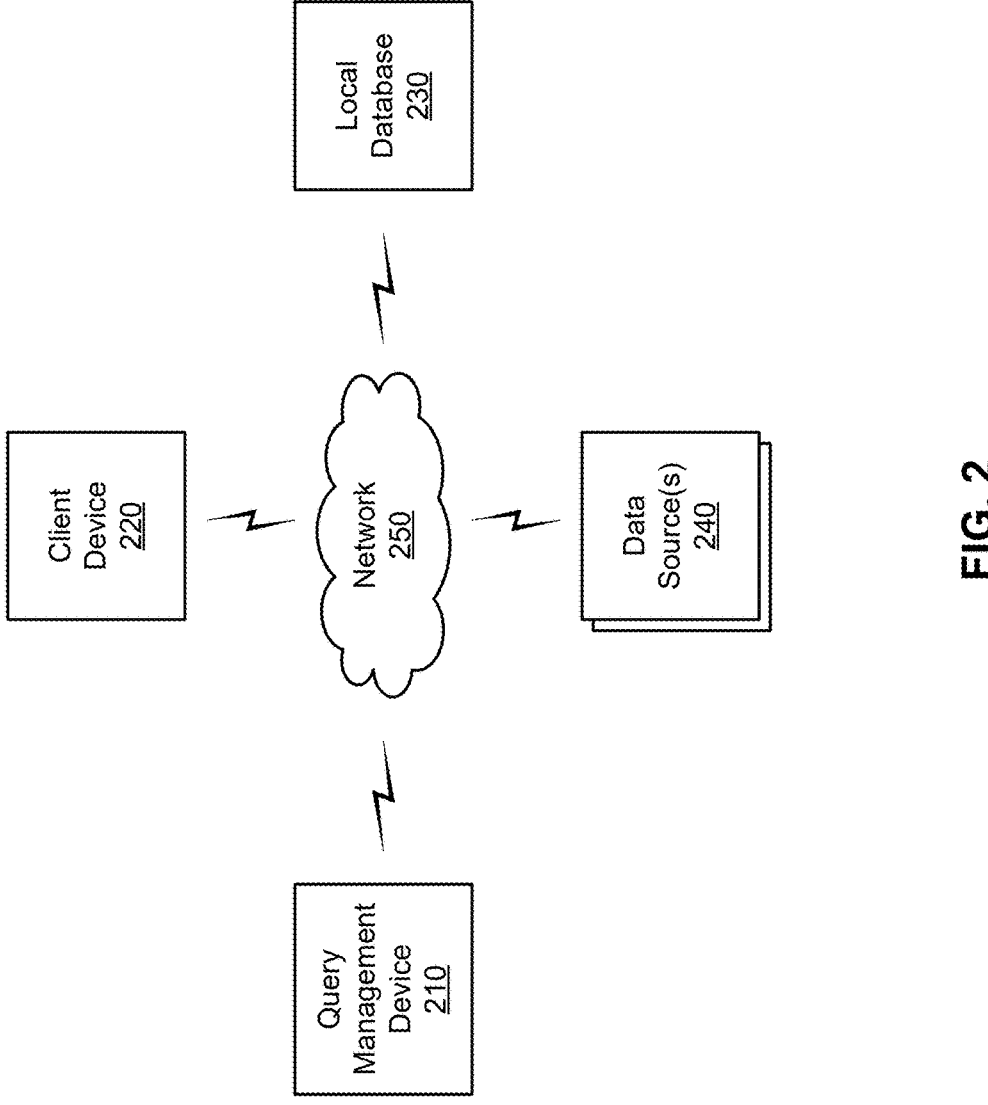
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a query management device 210, a client device 220, a local database 230, one or more data sources 240, and a network 250. Devices of environment 200 may interconnect via wired connections, wireless connections, or a combination of wired and wireless connections.

The query management device 210 may include one or more devices capable of receiving, generating, storing, processing, providing, and/or routing information associated with execution environment agnostic federated queries, as described elsewhere herein. The query management device 210 may include a communication device and/or a computing device. For example, the query management device 210 may include a server, such as an application server, a client server, a web server, a database server, a host server, a proxy server, a virtual server (e.g., executing on computing hardware), or a server in a cloud computing system. In some implementations, the query management device 210 may include computing hardware used in a cloud computing environment.

The client device 220 may include one or more devices capable of receiving, generating, storing, processing, and/or providing information associated with execution environment agnostic federated queries, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The local database 230 may include one or more devices capable of receiving, generating, storing, processing, and/or providing information associated with execution environment agnostic federated queries, as described elsewhere herein. The local database 230 may include a communication device and/or a computing device. For example, the local database 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the local database 230 may store an abstract syntax tree, one or more homogeneous SQL statements, and/or functions (e.g., register functions) for respective homogeneous SQL statements, among other examples as described elsewhere herein. In some implementations, the local database 230 may be "local" in that the local database 230 is stored at, by, and/or otherwise associated with the query management device 210.

A data source 240 may include one or more devices capable of receiving, generating, storing, processing, and/or providing information associated with execution environment agnostic federated queries, as described elsewhere herein. The data source 240 may include a communication device and/or a computing device. For example, the data source 240 may include a database, a data lake, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source(s) 240 may communicate with one or more other devices of environment 200, as described elsewhere herein.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
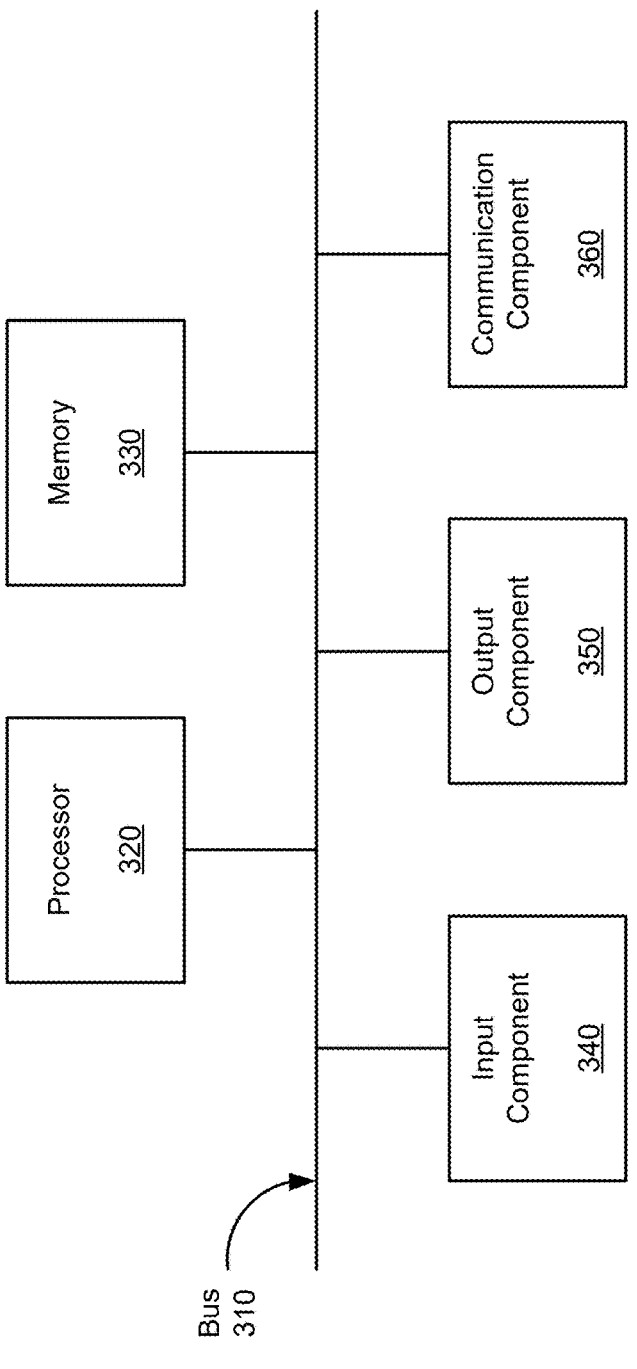
FIG. 3 is a diagram of example components of a device associated with execution environment agnostic federated queries, in accordance with some embodiments of the present disclosure.

FIG. 3 is a diagram of example components of a device 300 associated with execution environment agnostic federated queries. The device 300 may correspond to the query management device 210, a client device 220, the local database 230, and/or a data source 240. In some implementations, the query management device 210, a client device 220, the local database 230, and/or a data source 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection).

The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with execution environment agnostic federated queries. In some implementations, one or more process blocks of FIG. 4 may be performed by the query management device 210. In some implementations, one or more process blocks of FIG. 4 may be performed by another device or a group of devices separate from or including the query management device 210, such as the client device 220, the local database 230, and/or one or more data sources 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining a federated query for a set of data associated with multiple data sources (block 410). For example, the query management device 210 (e.g., using processor 320 and/or memory 330) may obtain a federated query for a set of data associated with multiple data sources, as described above in connection with reference number 115 of FIG. 1A. As an example, the federated query may be an SQL query.

As further shown in FIG. 4, process 400 may include generating, based on the federated query, an abstract syntax tree indicating relationships between statements included in the federated query (block 420). For example, the query management device 210 (e.g., using processor 320 and/or memory 330) may generate, based on the federated query, an abstract syntax tree indicating relationships between statements included in the federated query, as described above in connection with reference number 125 of FIG. 1B. As an example, the query management device 210 may parse the federated query to generate the abstract syntax tree.

As further shown in FIG. 4, process 400 may include identifying, based on the abstract syntax tree, one or more homogeneous statements in the federated query (block 430).

For example, the query management device 210 (e.g., using processor 320 and/or memory 330) may identify, based on the abstract syntax tree, one or more homogeneous statements in the federated query, as described above in connection with reference number 130 of FIG. 1B. In some implementations, the one or more homogeneous statements are associated with respective data sources of the multiple data sources.

As further shown in FIG. 4, process 400 may include registering, in a local database, one or more functions for respective homogeneous statements of the one or more homogeneous statements (block 440). For example, the query management device 210 (e.g., using processor 320 and/or memory 330) may register, in a local database, one or more functions for respective homogeneous statements of the one or more homogeneous statements, as described above in connection with reference number 145 of FIG. 1C. In some implementations, each function, of the one or more functions, indicates information that enables one or more operations to be performed as indicated by a homogeneous statement associated with that function. In some implementations, each function includes execution code associated with multiple execution environments.

As further shown in FIG. 4, process 400 may include generating, based on the federated query, a local query for the local database using the one or more functions (block 450). For example, the query management device 210 (e.g., using processor 320 and/or memory 330) may generate, based on the federated query, a local query for the local database using the one or more functions, as described above in connection with reference number 150 of FIG. 1C. In some implementations, the local query calls a subset of execution code, from the execution code associated with multiple execution environments, that is associated with an execution environment of the multiple execution environments. This enables the query management device 210 to execute the local query via a given (or any) execution environment of the multiple execution environments because the registered functions each include the execution code associated with the multiple execution environments.

As further shown in FIG. 4, process 400 may include executing, via the execution environment, the local query to perform the federated query for the set of data (block 460). For example, the query management device 210 (e.g., using processor 320 and/or memory 330) may execute, via the execution environment, the local query to perform the federated query for the set of data, as described above in connection with reference number 155 of FIG. 1D.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for execution environment agnostic federated queries, the system comprising:

one or more memories; and one or more processors, communicatively coupled to the one or more memories, configured to:

obtain configuration information which includes configurations for multiple execution environments, wherein the configuration information indicates sets of execution code association with the multiple execution environments;

obtain a federated structured query language (SQL) query requesting a set of data from multiple data sources;

parse, based on the configuration information, the federated SQL query to generate an abstract syntax tree indicating relationships between SQL statements included in the federated SQL query;

identify, based on the abstract syntax tree, one or more homogeneous SQL statements in the federated SQL query, wherein the one or more homogeneous SQL statements request one or more subsets of data, of the set of data, from respective data sources of the multiple data sources;

generate, based on executing the one or more homogeneous SQL statements, one or more functions for respective homogeneous SQL statements of the one or more homogeneous SQL statements, wherein each function, of the one or more functions, enables the one or more subsets of data to be accessible via a virtual table in a local database, and wherein each function includes the sets of execution code associated with the multiple execution environments;

generate, based on the federated SQL query, a local query to the local database using the one or more functions, wherein the local query accesses a subset of execution code, from the sets of execution code associated with the multiple execution environments, that is associated with an execution environment;

register, in the local database, the one or more functions; and execute, via the execution environment, the local query to obtain the set of data while the one or more functions are capable of being executed via the multiple execution environments.

2. The system of claim 1, wherein the one or more processors are further configured to:

obtain an indication that the execution environment is to be used to execute the federated SQL query.

3. The system of claim 1, wherein the one or more processors, to generate the one or more functions, are configured to:

perform, based on the abstract syntax tree, a common subexpression elimination operation to generate one or more common expressions, wherein at least one function of the one or more functions indicates a common expression of the one or more common expressions.

4. The system of claim 3, wherein the one or more common expressions are associated with respective hash identifiers, and wherein the at least one function indicates a hash identifier associated with the common expression.

5. The system of claim 1, wherein the one or more processors are further configured to:

perform one or more filtering operations for one or more SQL statements included in the federated SQL query;

generate, based on performing the one or more filtering operations, an updated version of the federated SQL query; and wherein the one or more processors, to generate the one or more functions, are configured to:

generate the one or more functions based on the updated version of the federated SQL query.

6. The system of claim 5, wherein the one or more filtering operations include at least one of:

a projection pushdown operation, or a predicate pushdown operation.

7. The system of claim 1, wherein the one or more processors, to generate the one or more functions, are configured to:

determine, for a data source of the multiple data sources and based on a homogeneous SQL statement of the one or more homogeneous SQL statements, one or more data access operations to access data, from the set of data, associated with the data source; and generate a function, of the one or more functions, to indicate the one or more data access operations.

8. A method for execution environment agnostic federated queries comprising:

obtaining, by a device, configuration information which includes configurations for multiple execution environments, wherein the configuration information indicates sets of execution code associated with the multiple execution environments;

obtaining, by the device, a federated query for a set of data associated with multiple data sources;

generating, by the device and based on the federated query and the configuration information, an abstract syntax tree indicating relationships between statements included in the federated query;

identifying, by the device and based on the abstract syntax tree, one or more homogeneous statements in the federated query, wherein the one or more homogeneous statements are associated with respective data sources of the multiple data sources;

registering, by the device and in a local database, one or more functions for respective homogeneous statements of the one or more homogeneous statements, wherein each function, of the one or more functions, indicates information that enables one or more operations to be performed as indicated by a homogeneous statement associated with that function, and wherein each function includes the sets of execution code associated with the multiple execution environments;

generating, by the device and based on the federated query, a local query for the local database using the one or more functions, wherein the local query calls a subset of execution code, from the sets of execution code associated with the multiple execution environments, that is associated with an execution environment of the multiple execution environments; and executing, by the device and via the execution environment, the local query to perform the federated query for the set of data while the one or more functions are capable of being executed via the multiple execution environments.

9. The method of claim 8, wherein executing the local query comprises at least one of:

obtaining at least a first portion of the set of data from the multiple data sources;

joining at least a second portion of the set of data from the multiple data sources; or writing at least a third portion of the set of data to the multiple data sources.

10. The method of claim 8, further comprising:

obtaining an indication that the execution environment is to be used to execute the federated query.

11. The method of claim 8, further comprising:

performing, based on the abstract syntax tree, a common subexpression elimination operation to generate one or more common expressions, wherein at least one function of the one or more functions indicates a common expression of the one or more common expressions.

12. The method of claim 11, wherein the one or more common expressions are associated with respective identifiers, and wherein the at least one function indicates an identifier associated with the common expression.

13. The method of claim 8, further comprising:

performing one or more filtering operations for one or more statements included in the federated query;

generating, based on performing the one or more filtering operations, an updated version of the federated query; and generating the one or more functions based on the updated version of the federated query.

14. The method of claim 8, further comprising:

determining, for a data source of the multiple data sources and based on a homogeneous SQL statement of the one or more homogeneous SQL statements, one or more data access operations to access data, from the set of data, associated with the data source; and generating a function, of the one or more functions, to indicate the one or more data access operations.

15. The method of claim 8, wherein registering the one or more functions comprises:

storing views for respective functions of the one or more functions in the local database.

16. A non-transitory computer-readable medium storing a set of instructions, the set of instructions comprising:

one or more instructions that, when executed by one or more processors of a device, cause the device to:

obtain configuration information which includes configurations for multiple execution environments, wherein the configuration information indicates sets of execution code association with the multiple execution environments;

obtain a federated structured query language (SQL) query requesting a set of data from multiple data sources;

parse, based on the configuration information, the federated SQL query to generate an abstract syntax tree indicating relationships between SQL statements included in the federated SQL query;

identify, based on the abstract syntax tree, one or more homogeneous SQL statements in the federated SQL query, wherein the one or more homogeneous SQL statements request one or more subsets of data, of the set of data, from respective data sources of the multiple data sources;

generate, based on executing the one or more homogeneous SQL statements, one or more functions for respective homogeneous SQL statements of the one or more homogeneous SQL statements, wherein each function, of the one or more functions, enables the one or more subsets of data to be accessible via a virtual table in a local database, and wherein each function includes the sets of execution code associated with the multiple execution environments;

generate, based on the federated SQL query, a local query to the local database using the one or more functions, wherein the local query accesses a subset of execution code, from the sets of execution code associated with the multiple execution environments, that is associated with an execution environment; and execute, via the execution environment, the local query to obtain the set of data while the one or more functions are capable of being executed via the multiple execution environments.

17. The non-transitory computer-readable medium of claim 16, wherein the one or more instructions, that cause the device to generate the one or more functions, cause the device to:

perform, based on the abstract syntax tree, a common subexpression elimination operation to generate one or more common expressions, wherein at least one function of the one or more functions indicates a common expression of the one or more common expressions.

18. The non-transitory computer-readable medium of claim 16, wherein the one or more instructions further cause the device to:

perform one or more filtering operations for one or more SQL statements included in the federated SQL query;

generate, based on performing the one or more filtering operations, an updated version of the federated SQL query; and wherein the one or more instructions, that cause the device to generate the one or more functions, cause the device to:

generate the one or more functions based on the updated version of the federated SQL query.

19. The non-transitory computer-readable medium of claim 18, wherein the one or more filtering operations include at least one of:

a projection pushdown operation, or a predicate pushdown operation.

20. The non-transitory computer-readable medium of claim 16, wherein the one or more instructions, that cause the device to generate the one or more functions, cause the device to:

determine, for a data source of the multiple data sources and based on a homogeneous SQL statement of the one or more homogeneous SQL statements, one or more data access operations to access data, from the set of data, associated with the data source; and generate a function, of the one or more functions, to indicate the one or more data access operations.

* * * * *